(12) United States Patent
Tun et al.

(10) Patent No.: US 11,297,874 B2
(45) Date of Patent: *Apr. 12, 2022

(54) ASSISTING APPARATUS FOR BEAN ROASTING AND BEAN ROASTING APPARATUS

(71) Applicant: JIYONSON CO., LTD., New Taipei (TW)

(72) Inventors: Yun-Long Tun, New Taipei (TW); Chia-Yen Liu, New Taipei (TW); Yi-Chi Lin, New Taipei (TW)

(73) Assignee: JIYONSON CO., LTD., New Taipei (TW)

(*) Notice: Subject to any disclaimer, the term of this patent is extended or adjusted under 35 U.S.C. 154(b) by 581 days.

This patent is subject to a terminal disclaimer.

(21) Appl. No.: 16/194,063

(22) Filed: Nov. 16, 2018

(65) Prior Publication Data

US 2019/0142053 A1 May 16, 2019

Related U.S. Application Data

(60) Provisional application No. 62/587,448, filed on Nov. 16, 2017.

(51) Int. Cl.
*A23N 12/12* (2006.01)
*H04R 1/08* (2006.01)
(Continued)

(52) U.S. Cl.
CPC .............. *A23N 12/125* (2013.01); *A23F 5/04* (2013.01); *A23N 12/08* (2013.01); *G05B 15/02* (2013.01);
(Continued)

(58) Field of Classification Search
CPC ........ A23N 12/125; A23N 12/08; G06T 7/90; A23F 5/04; G05B 15/02; G06K 9/6212;
(Continued)

(56) References Cited

U.S. PATENT DOCUMENTS 4,325,191 A * 4/1982 Kumagai ............... A23N 12/12
34/571
5,076,157 A * 12/1991 Satake .................. A23N 15/06
99/519
(Continued)

FOREIGN PATENT DOCUMENTS

CN 106579488 A 4/2017
DE 1029295 B 4/1958
(Continued)

OTHER PUBLICATIONS

The extended European Search Report rendered by the European Patent Office for European Patent Application No. 18206615.9, dated Apr. 2, 2019, 19 pages.
(Continued)

*Primary Examiner* — Jimmy Chou
(74) *Attorney, Agent, or Firm* — Skaar Ulbrich Macari, P.A.

(57) ABSTRACT

An assisting apparatus for bean roasting and a bean roasting apparatus are provided. The assisting apparatus captures a scene in a chamber of the bean roasting device through an image capturing device to generate an image, compares the image with a historical roasting pattern set based on a plurality of color attributes of a color space to determine a roasting level represented by the image, and controls the bean roasting procedure.

15 Claims, 6 Drawing Sheets

(51) Int. Cl.
*A23F 5/04* (2006.01)
*G10L 25/51* (2013.01)
*G10L 25/21* (2013.01)
*H04R 1/02* (2006.01)
*A23N 12/08* (2006.01)
*G06T 7/90* (2017.01)
*G05B 15/02* (2006.01)
*G06K 9/62* (2022.01)
*G06K 9/32* (2006.01)

(52) U.S. Cl.
CPC .............. *G06K 9/6212* (2013.01); *G06T 7/90* (2017.01); *G10L 25/21* (2013.01); *G10L 25/51* (2013.01); *H04R 1/028* (2013.01); *H04R 1/08* (2013.01); *G06K 9/3233* (2013.01); *G06K 2009/6213* (2013.01); *G06K 2209/17* (2013.01)

(58) Field of Classification Search
CPC ......... G06K 9/3233; G06K 2009/6213; G06K 2209/17; G10L 25/21; G10L 25/51; H04R 1/028; H04R 1/08
USPC .......................................................... 99/332
See application file for complete search history.

(56) References Cited

U.S. PATENT DOCUMENTS

| | | | | |
|---|---|---|---|---|
| 5,387,256 A * | 2/1995 | Enomoto | ................ | A47J 31/42 34/233 |
| 6,679,163 B1 * | 1/2004 | Su | ......................... | A23N 12/08 99/339 |
| 7,143,686 B1 * | 12/2006 | Sandolo | ................... | A23F 5/04 99/286 |
| 7,455,867 B1 * | 11/2008 | Gutwein | ............... | A47J 31/002 426/594 |
| 9,386,798 B2 * | 7/2016 | Sewell | ................ | A23N 12/083 |
| 10,517,313 B2 * | 12/2019 | Tan | ........................ | G01N 21/00 |
| 2004/0074400 A1 * | 4/2004 | Song | ...................... | A23N 12/10 99/483 |
| 2004/0081724 A1 | 4/2004 | Dria et al. | | |
| 2005/0128484 A1 * | 6/2005 | Rodrigues | ............. | G06T 11/001 356/402 |
| 2007/0221668 A1 * | 9/2007 | Baarman | ................. | H02J 50/80 219/746 |
| 2008/0134907 A1 * | 6/2008 | Iiyama | .................. | A23N 12/08 99/467 |
| 2009/0220645 A1 * | 9/2009 | Martinez | ................... | A23F 5/02 426/45 |
| 2011/0253693 A1 * | 10/2011 | Lyons | ................. | F24C 15/2021 219/209 |
| 2012/0265364 A1 * | 10/2012 | Zambrano | .............. | A23N 12/08 700/300 |
| 2013/0186887 A1 * | 7/2013 | Hallgren | .................. | H05B 6/68 219/702 |
| 2013/0202748 A1 * | 8/2013 | Fountain | ............ | B65D 85/8043 426/115 |
| 2013/0302483 A1 * | 11/2013 | Riefenstein | ............. | G06T 7/001 426/233 |
| 2014/0076167 A1 * | 3/2014 | Boggavarapu | .......... | A47J 31/42 99/286 |
| 2014/0203012 A1 * | 7/2014 | Corona | ................ | H05B 6/6447 219/705 |
| 2014/0242239 A1 * | 8/2014 | Boggavarapu | ...... | A47J 31/3633 426/433 |
| 2014/0370181 A1 * | 12/2014 | Young | ....................... | A23F 5/12 426/595 |
| 2015/0201796 A1 * | 7/2015 | Kuempel | ................ | H04L 67/10 426/231 |
| 2015/0330640 A1 * | 11/2015 | Stork | ........................ | F24C 7/08 99/332 |
| 2016/0066744 A1 * | 3/2016 | Baxi | ..................... | A47J 36/321 99/343 |
| 2016/0097711 A1 * | 4/2016 | Wang | ..................... | G01N 21/27 250/206 |
| 2016/0120211 A1 * | 5/2016 | Wilson | ................. | A23N 12/125 426/233 |
| 2016/0198885 A1 * | 7/2016 | Logan | ..................... | A47J 36/00 99/325 |
| 2017/0055542 A1 * | 3/2017 | Cameron | .................. | A23F 5/46 |
| 2017/0215451 A1 * | 8/2017 | Tan | ........................ | G01N 29/00 |
| 2017/0360242 A1 * | 12/2017 | Boggavarapu | ....... | A23N 12/125 |
| 2018/0343913 A1 * | 12/2018 | Tun | ...................... | A23N 12/125 |

FOREIGN PATENT DOCUMENTS

| | | | | |
|---|---|---|---|---|
| DE | 3540751 A1 | 5/1987 | | |
| DE | 19645306 A1 | 11/1997 | | |
| EP | 3409133 A1 | 12/2018 | | |
| JP | 2005087063 A | 4/2005 | | |
| MX | 2009000902 A | 7/2010 | | |
| TW | 201136537 A | 11/2011 | | |
| TW | 201216870 A | 5/2012 | | |
| TW | 532167 U * | 11/2016 | .......... | A23N 12/125 |
| TW | I555473 B | 11/2016 | | |
| TW | M532167 U | 11/2016 | | |
| WO | 9956601 A1 | 11/1999 | | |
| WO | 2014191873 A1 | 12/2014 | | |
| WO | 2016020266 A1 | 2/2016 | | |
| WO | WO-2016020266 A1 * | 2/2016 | .............. | A47J 31/42 |

OTHER PUBLICATIONS

Office Action to the corresponding Japanese Patent Application rendered by the Japan Patent Office (JPO) dated Sep. 1, 2020, 14 pages (including English translation).

Office Action to the corresponding Taiwan Patent Application No. 107140421 rendered by the Taiwan Intellectual Property Office (TIPO) dated Aug. 12, 2019, 13 pages (including English translation).

Office Action to the corresponding Japan Patent Application rendered by the Japan Patent Office (JPO) dated Dec. 10, 2019, 14 pages (including English translation).

Office Action to the corresponding Chinese Patent Application dated Mar. 3, 2021, 19 pages (including English translation).

Office Action to the corresponding Chinese Patent Application dated Oct. 25, 2021, 14 pages (including English translation).

* cited by examiner

| Number | Historical roasting pattern | stage | RGB color attributes |
|---|---|---|---|
| C1 |  | Green Coffee | P1 |
| C2 |  | Begins to Pale | P2 |
| C3 |  | Early Yellow | P3 |
| C4 |  | Yellow-Tan | P4 |
| C5 |  | Light Brown | P5 |
| C6 |  | Brown | P6 |
| C7 |  | 1st Crack Starts | P7 |

FIG. 2B

| Number | Historical roasting pattern | stage | RGB color attributes |
|---|---|---|---|
| C8 |  | 1st Crack Done | P8 |
| C9 |  | City Roast | P9 |
| C10 |  | City+ | P10 |
| C11 |  | Full City | P11 |
| C12 |  | Full City and 2nd Crack | P12 |
| C13 |  | Vienna-Light French | P13 |
| C14 |  | Full French | P14 |
| C15 |  | Charcoal, dead | P15 |
| C16 |  | Fire Risk | P16 |

ASSISTING APPARATUS FOR BEAN ROASTING AND BEAN ROASTING APPARATUS

PRIORITY

This application claims the benefit of priority based on U.S. Provisional Application Ser. No. 62/587,448 filed on Nov. 16, 2017, which is hereby incorporated by reference in its entirety.

FIELD

The present invention relates to a bean roasting apparatus and an assisting apparatus for bean roasting. More particularly, the bean roasting apparatus and the assisting apparatus for bean roasting of the present invention may accurately determine the roasting level and maintain the roasting quality.

BACKGROUND

Roasting technology of coffee beans is a technology that requires a lot of operational experiences to be skilled. Depending on the different demands for the flavor of the coffee, the coffee beans need to be roasted to different stages. Currently, there are two main technical methods for determining the roasting levels of the coffee beans during the roasting of the coffee beans. The first method determines the roasting levels by observing the colors of the coffee beans during the roasting of the coffee beans, and the second method determines the roasting levels by the sound generated during the roasting of the coffee beans.

Specifically, determination of the roasting levels based on the colors of the coffee beans is mainly achieved by an instrument (e.g., Agtron, a coffee roasting tester) or by manually comparing the color of the coffee beans with coffee roasting color cards (e.g., the roasting color cards formulated by Specialty Coffee Association of America (SCAA)) so as to identify the roasting levels of coffee beans. However, the traditional instruments determine the brightness (e.g., Agtron number) of coffee beans by far infrared ray which is unable to further identify other colors (e.g., the green, yellow, brown, etc. colors that the coffee beans appears when roasting in the early stage). It requires relevant experiences for manually comparing the colors of the beans with the coffee roasting color cards. Because there is no specific standardized numerical reference for the comparison, the comparison quality may be unstable when determining by different people.

Traditionally, there are two methods for determining the colors when roasting coffee beans: the first method is to determine the roasting level of the coffee beans by an instrument after roasting the coffee beans, or by manually comparing the coffee beans with the coffee roasting color cards after roasting the coffee beans, and then manually record the result on paper. However, by this method, it is impossible to obtain the current roasting levels of the coffee beans during roasting. The method can only obtain the roasting levels of the coffee beans after the coffee beans are roasted. When the roasting level of the coffee beans is found to be insufficient or excessive, the method can only be adjusted in the next time of roasting the coffee beans, which leads to incapable of controlling the roasting levels of the coffee beans.

The second method is to take out the beans by a bean-taking stick during the roasting process, and determine the roasting level of the coffee beans by an instrument, or by manually comparing the coffee beans with the coffee roasting color cards. Although the manually comparison takes less time to determine the roasting level of the coffee beans, the manually comparison may lead to unstable quality due to only relying on human determination.

The instrument determination may obtain more accurate roasting level, this method, however, requires a certain amount of sample coffee beans to be determined outside during the roasting process. Since the instrument determination takes a long time, the temperature of the sample coffee beans will decrease. Thereafter, when the sample coffee beans are mixed with other coffee beans for re-roasting, the overall flavor and quality are affected by the temperature difference.

Accordingly, an urgent need exists in the art to provide an assisting mechanism for bean roasting so as to precisely determine the bean roasting levels and maintain the roasting quality.

SUMMARY

An object is to provide an assisting mechanism for bean roasting, by capturing a scene in a chamber of a bean roasting device, comparing the image with the historical roasting pattern set to determine a roasting level represented by the image and generate a control signal, and informing the roaster of the current roasting level of the coffee beans through in various ways. In this way, compared with the prior art, the assisting mechanism for bean roasting of the present invention may accurately determine the roasting level of the coffee beans without human intervention, reduce the influence of human interference factors to assist the roaster in the roasting process to obtain real-time roasting level of the coffee beans, so that the roaster may receive the roasting information of the bean roasting device without the need of waiting beside the bean roasting device for a long time. In addition, the assisting mechanism for bean roasting of the present invention may further achieve automated roasting of performing the operation such as roasting, off-loading the beans, and the like according to the roasting level set by the roaster.

Provided herein is an assisting apparatus for bean roasting, which comprises a storage, an image capturing device, and a processor. The storage is configured to store a historical roasting pattern set, and the image capturing device is configured to capture a scene in a chamber of a bean roasting device to generate an image. The processor is electrically connected to the storage and the image capturing device, and configured to receive the image from the image capturing device, and compare the image with the historical roasting pattern set based on a plurality of color attributes of a color space to determine a roasting level represented by the image and generate a control signal.

Also provided is a bean roasting apparatus which comprises a chamber, a storage, an image capturing device, and a processor. The storage is configured to store a historical roasting pattern set, and the image capturing device is configured to capture a scene in the chamber to generate an image. The processor is electrically connected to the storage and the image capturing device, and configured to receive the image from the image capturing device, and compare the image with the historical roasting pattern set based on a plurality of color attributes of a color space to determine a roasting level represented by the image and generate a control signal.

The detailed technology and preferred embodiments implemented for the present invention are described in the following paragraphs accompanying the appended drawings for people skilled in this field to well appreciate the features of the claimed invention.

DETAILED DESCRIPTION

In the following description, the present invention will be explained with reference to certain example embodiments thereof. However, these example embodiments are not intended to limit the present invention to any specific example, embodiment, environment, applications or particular implementations described in these example embodiments. Therefore, description of these example embodiments is only for purpose of illustration rather than to limit the scope of the present invention. It shall be appreciated that, in the following embodiments and the attached drawings, elements unrelated to the present invention are omitted from depiction.

Figure 1:
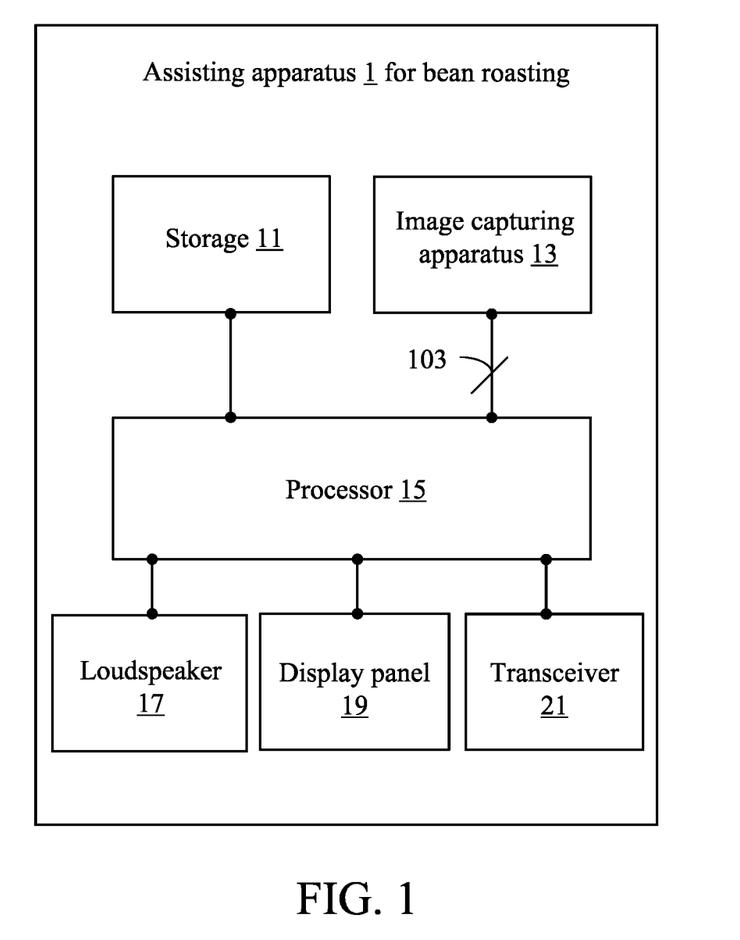
FIG. 1 depicts a schematic view of an assisting apparatus 1 for bean roasting according to the present invention.
Figure 2A:
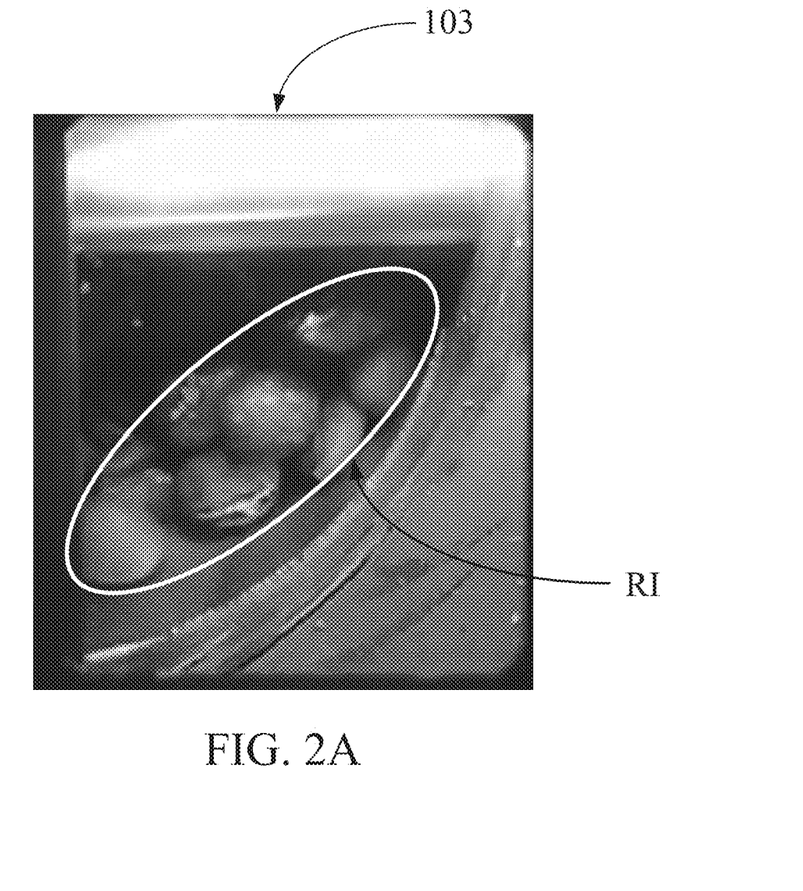
FIG. 2A depicts a schematic view of image 103 captured by an image capturing device of the present invention.

FIG. 1 depicts a schematic view of an assisting apparatus 1 for bean roasting according to a first embodiment of the present invention. The assisting apparatus 1 for bean roasting comprises a storage 11, an image capturing device 13, and a processor 15. The processor 15 is electrically connected to the storage 11 and the image capturing device 13. The storage 11 may be a flash memory, a hard disk or any storage medium having the same function. The image capturing device 13 may be any device having an image capturing function. The assisting apparatus 1 for bean roasting is disposed adjacent to a bean roasting device (e.g., disposed at a side or at the top or bottom of the chamber of the bean roasting device) to capture the image in the chamber during the roasting process (As shown in FIG. 2A, the scene of the coffee beans during the roasting process).

Figure 2B:
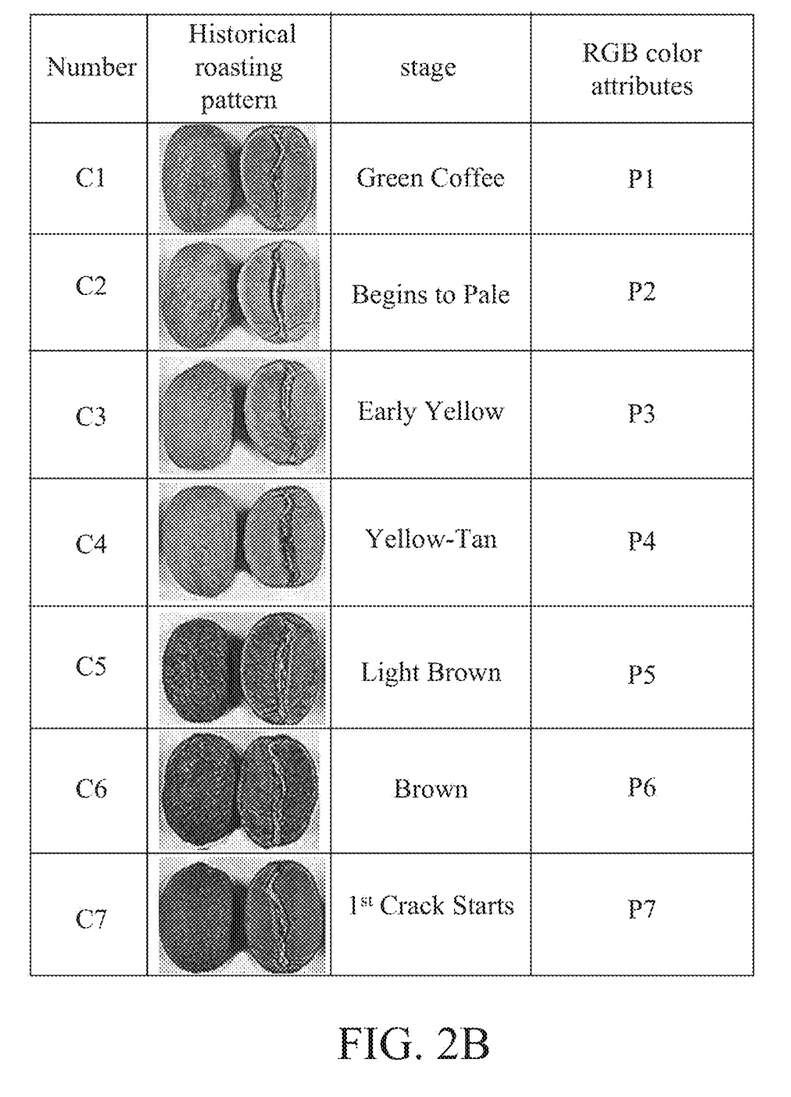
FIG. 2B depicts a schematic view of the number C1 to C7 of a historical roasting pattern set of the present invention.
Figure 2C:
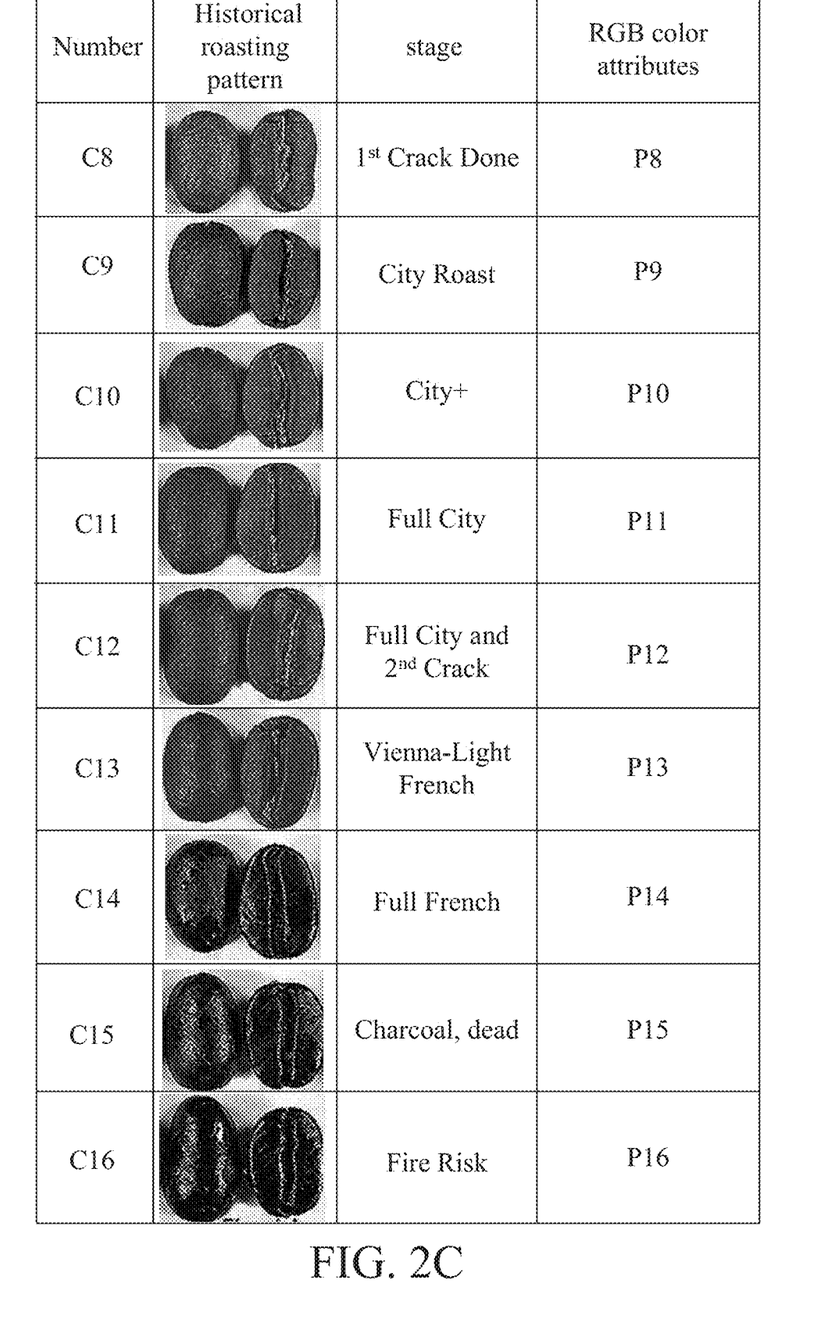
FIG. 2C depicts a schematic view of the number C8 to C16 of a historical roasting pattern set of the present invention.

In this embodiment, the storage 11 stores a historical roasting pattern set. For example, as shown in FIG. 2B and FIG. 2C, the historical roasting pattern set comprises a plurality of historical roasting patterns, each of the historical roasting patterns corresponds to a roasting level and a plurality of color attributes of a color space. As shown in FIG. 2B and FIG. 2C, the 16 historical roasting patterns sequentially correspond to the numbers C1 to C16, different stages of roasting, and a plurality of color attributes in the RGB (Red, Green, Blue) color space.

Taking the historical roasting patterns of the numbers C1 and C2 as an illustration, the roasting level corresponding to the historical roasting pattern of the number C1 is at the Green Coffee stage with the RGB color attribute P1 (e.g.: (150, 80, 60)), and the roasting level corresponding to the historical roasting pattern of the number C2 is at the Begins to Pale stage with the RGB color attribute P2 (e.g.: (145, 70, 55)). Similarly, the roasting levels corresponding to the historical roasting patterns of the numbers C3 to C16 are at the Early Yellow stage, the Yellow-Tan stage, the Light Brown stage, the Brown stage, the $1^{st}$ Crack Starts stage, the $1^{st}$ Crack Done stage, the City Roast stage, the City+ stage, the Full City stage, the Full City and $2^{nd}$ Crack stage, the Vienna-Light French stage, the Full French stage, the Charcoal, dead stage and the Fire Risk stage respectively, and these stages have the RGB color attributes P3 to P16, respectively.

It should be noted that the present invention does not limit the number of historical roasting patterns in the historical roasting pattern sets, the presentation manner of the historical roasting patterns, the evaluation criteria of the roasting level, and the color space of the color attributes. In other words, in other embodiments, the number of historical roasting patterns may be greater than or less than 16, the roasting level may also be represented by an absolute value, and the color space may also be selected as an HSV (Hue, Saturation, Value) color space. Since people skilled in the art shall appreciate various expressions of the historical roasting pattern set and the contents thereof of the present invention, and thus this will not be further described here.

In the embodiment, the image capturing device 13 periodically captures the image of the chamber during the roasting process to generate an image 103. The processor 15 receives the image 103 from the image capturing device 13. Next, based on a plurality of color attributes of a color space of the image 103, the processor 15 compares the image 103 with the historical roasting pattern set to determine a roasting level represented by the image 103 roasting level. Subsequently, the processor 15 generates a control signal according to the roasting level represented by the image 103 to indicate the roasting level corresponding to the image 103. It should be noted that the image 103 and the historical roasting pattern set may be compared by various conventional image matching algorithms (e.g., by comparing the average values of the color attributes of the image 103), that is, any method for comparing the color attributes of images could be applied to the invention.

Continued to the foregoing examples referring to FIGS. 2B and 2C, the processor 15 compares the color attributes of the RGB color space of the image 103 to the color attributes P1 to P16 corresponding to the respective historical roasting patterns numbered C1 to C16 in the historical roasting pattern set to determine the roasting level represented by the current images 103. For example, the processor 15 determines that the color attributes of the image 103 are closest to the color attribute P6 of the number C6 historical roasting pattern, and the processor 15 may determine that the current roasting level is at a Brown stage. Next, the processor 15 generates a control signal according to the current roasting level (i.e. at the Brown stage) of the coffee beans.

It should be noted that the image 103 may also be represented by any color space (e.g., HSV (Hue, Saturation, Value) color space, RGB (Red, Green, Blue) color space, etc.) The representation of images may be freely converted from one color space to another color space. For example, if the image 103 is represented in HSV color space, the processor 15 may convert the image 103 represented in the HSV color space to RGB color space to conform to the RGB color attributes used by the historical roasting pattern set. Since the method for converting the color space is well known by a person having ordinary skill in the art, and thus this will not be further described here.

In some embodiments, the processor 15 may store a database which records a plurality of histograms corresponding to each of the historical roasting patterns. Each of the histograms is drawn with the hue value and the saturation value of every pixel in its corresponding historical roasting pattern. After receiving the image 103 from the image capturing device 13, the processor 15 converts the image 103 from represented in an RGB color space to represented in an HSV color space, and further calculates the hue value and the saturation value of each pixel in the image 103, and draw them as a histogram. Then, the processor 15 performs a correlation analysis with the histogram representing the image 103 and the histograms stored in the database. When the correlations between the image 103 and the image stored in the database and between the consecutive N images after the image 103 and the image stored in the database exceed a set threshold, a corresponding roasting level of the image 103 may be determined, wherein the number "N" is a positive real number and the value setting of the number "N" is determined by the need for different precision.

In some embodiments, as shown in FIG. 2A, the processor 15 determines a region of interest RI on the image 103, and only compares the pixels in the region of interest RI of the image 103 with the historical roasting pattern set. In other words, by determining the region of interest, the processor 15 may only extract pixels in the region of interest RI of the image 103 to decrease the range for comparison and improve the accuracy and efficiency of comparing images by the processor 15. It should be noted that the processor 15 may preset the region of interest (e.g., determining according to the position of the image captured by the image capturing device 13 or determining by the position of the previous comparison of the image). The method of determining the region of interest should be appreciated by those of ordinary skill in the art, and thus this will not be further described here. In some embodiments, the image capturing device 13 captures the image 103 directly from the region of interest RI, that is, the processor 15 directly setting the needed capturing range for the image capturing device 13 to capture.

The following descriptions describe how to use the control signal for various applications after the assisting apparatus 1 for bean roasting generates the control signal. In an embodiment, the assisting apparatus 1 for bean roasting may further comprises a loudspeaker 17 electrically connected to the processor 15. In this case, the processor 15 may transmit the generated control signal to the loudspeaker 17 to make the loudspeaker 17 send a reminder signal. In this way, as the assisting apparatus 1 for bean roasting determines different roasting levels (i.e., the $1^{st}$ Crack Starts stage, the $1^{st}$ Crack Done stage, the Full City and $2^{nd}$ Crack stage, etc.), the user may decide the time to offload the beans according to the reminder signal.

In addition, in an embodiment, the assisting apparatus 1 for bean roasting further comprises a display panel 19 electrically connected to the processor 15. In this case, the processor 15 may transmit the generated control signal to the display panel 19 to make the display panel 19 display a reminder screen. In this way, as the assisting apparatus 1 for bean roasting determines the roasting level, the user may decide the time to offload the bean according to the reminder screen.

In addition, in an embodiment, the assisting apparatus 1 for bean roasting may further comprises a transceiver 21 electrically connected to the processor 15. In this case, the processor 15 may transmit the generated control signal to the transceiver 21 to make the transceiver 21 transmit a reminder message to a user equipment according to the received control signal. For example, the user equipment may be a smart phone, and the manufacturer of the assisting apparatus 1 for bean roasting may design an application which may be installed in the smart phone. Therefore, when the smart phone of the user is installed with the application, the smart phone may be connected to the assisting apparatus 1 for bean roasting directly (directly via wireless technology) or indirectly (via regional network, internet, etc.) to receive the reminder message from the assisting apparatus 1 for bean roasting. In this way, as the assisting apparatus 1 for bean roasting determines the roasting level, the user may be notified immediately and decide the time to offload the beans.

In addition, in an embodiment, the assisting apparatus 1 for bean roasting may further comprises a transceiver 21 electrically connected to the processor 15. In this case, the processor 15 may transmit the generated control signal to the transceiver 21, so that the transceiver 21 transmits another control signal to the bean roasting device to make the bean roasting device to automatically perform an operation (e.g., a roasting operation, a bean offloading operation).

For example, the user equipment may set the assisting apparatus 1 for bean roasting to generate a control signal when the roasting level is at a Pt crack starts stage, so that the assisting apparatus 1 for bean roasting automatically generates and transmits the another control signal to the bean roasting device to make the bean roasting device automatically perform the bean offloading operation in response to the another control signal. Furthermore, the user may remotely monitor the roasting condition of the coffee beans by operating the application through the user equipment, and make the user equipment generate remote control signal and transmit the remote control signal to the assisting apparatus 1 for bean roasting to remotely control the subsequent process of beans offloading and coffee beans cooling via the assisting apparatus 1 for bean roasting.

In addition, since the coffee beans at each stage have their proper roasting operation mode, the assisting apparatus 1 for bean roasting may also instruct the bean roasting device to perform the corresponding roasting operation according to the current roasting level of the coffee beans. For example, in a general coffee bean roasting process, when the roasting level of the coffee beans is at the Early Yellow stage, the volume of coffee beans will begin to expand. Therefore, when the assisting apparatus 1 for bean roasting determines that the roasting level of the current coffee bean is at the Early Yellow stage, the assisting apparatus 1 for bean roasting may automatically instruct the bean roasting device to increase the heating power to accelerate the dehydration of the coffee beans to make the coffee beans volume expand more.

For another example, in a general roasting process of coffee beans, when the roasting level of the coffee bean is at a $1^{st}$ Crack Starts stage, the coffee bean will start to undergo Maillard reaction and Caramelization reaction intensely and rapidly. Therefore, when the assisting apparatus 1 for bean roasting determines that the roasting level of the current coffee bean is at $1^{st}$ Crack Starts stage, the assisting apparatus 1 for bean roasting may automatically instruct the bean roasting device to reduce the heating power to avoid the coffee bean being over roasted, and extent the reaction time of the Maillard reaction and the reaction time of the Caramelization reaction to obtain a better flavor of coffee beans. In addition, since the coffee beans will discharge a large amount of moisture at this stage, the assisting apparatus 1 for bean roasting may automatically instruct the bean roasting device to enlarge the damper to discharge the moisture from the chamber to prevent the coffee beans from producing lithe stuffy flavor.

For another example, in a general coffee bean roasting process, when the roasting level of the coffee beans is at the $1^{st}$ Crack Done stage, the temperature of the coffee beans may easily increase rapidly due to the decrease of the water content in the coffee beans at this stage. Therefore, when the assisting apparatus 1 for bean roasting determines that the roasting level of the current coffee bean is at the $1^{st}$ Crack Done stage, the assisting apparatus 1 for bean roasting may automatically instruct the bean roasting device to reduce the heating power to prevent the coffee beans from entering the next roasting level too fast.

For another example, in the general coffee bean roasting process, when the roasting level of the coffee beans is at the Full City and $2^{nd}$ Crack stage, the fume generated in this roasting level may increase greatly. Therefore, when the assisting apparatus 1 for bean roasting determines that the roasting level of the current coffee bean is at the Full City and $2^{nd}$ Crack stage, the assisting apparatus 1 for bean roasting may automatically instruct the bean roasting device to enlarge the damper to discharge the fume.

It should be noted that the aforementioned automatic roasting operation may be completed by a configuration file established by the developer of the assisting apparatus 1 for bean roasting. The configuration file may be generated by the ways of network downloading, automatic updating or other user self-adjustment, and the configuration file is read by the assisting apparatus 1 for bean roasting to perform related configuration and operation. Furthermore, different configuration files may be stored for different types of coffee beans to allow the assisting apparatus 1 for bean roasting to perform different automatic roasting processes. Since a person having ordinary skill in the art may understand how to achieve the aforementioned automatic roasting operation by the configuration files, no further description are made here.

In addition, in an embodiment, the assisting apparatus 1 for bean roasting may further comprises a transceiver 21 electrically connected to the processor 15. In this case, the processor 15 may receive a feedback signal from a user equipment via the transceiver 21, and updates the historical roasting pattern set according to the feedback signal. For example, if the user thinks that the selected historical roasting pattern may not accurately represent the roasting level of the current coffee beans and wants to add a new historical roasting pattern to the historical roasting pattern set, then the feedback signal may comprises a new historical roasting pattern and a roasting level and a plurality of color attributes corresponding to the new historical roasting pattern to update the historical roasting pattern set. In addition, the user may also generate the new historical roasting pattern and the corresponding roasting level by the image 103 captured by the image capturing device 13.

Figure 3:
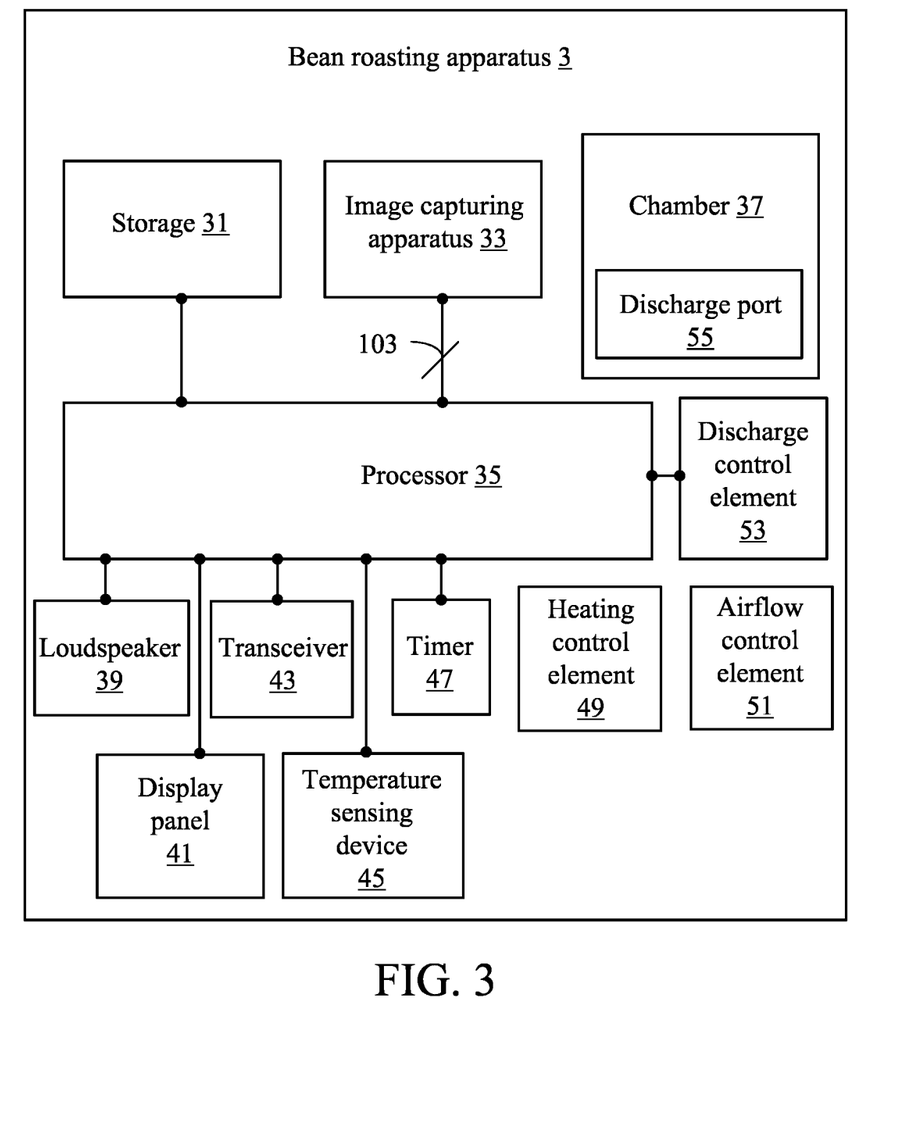
FIG. 3 depicts a schematic view of a bean roasting apparatus 3 of the present invention.

A second embodiment of the present invention is a bean roasting apparatus 3 as shown in FIG. 3. The difference between this embodiment and the first embodiment is that the assisting apparatus 1 for bean roasting in the first embodiment is integrated in the bean roasting apparatus 3. Specifically, the bean roasting apparatus 3 comprises a storage 31, an image capturing device 33, a processor 35, and a chamber 37. The processor 35 is electrically connected to the storage 31 and the image capturing device 33. The image capturing device 33 may be disposed adjacent to the chamber 37 and isolated from the chamber 37 by a transparent material to capture scenes of the chamber.

Similarly, the storage 31 stores a historical roasting pattern set which comprises the aforementioned historical roasting patterns. The image capturing device 33 periodically captures the image of the chamber during the roasting process to generate an image 103. Next, the processor 35 receives the image 103 from the image capturing device 33, and compares the image 103 with the historical roasted pattern set based on the color attributes of the image 103 of the color space to determine the roasting level represented by the image 103. Subsequently, the processor 35 generates a control signal based on the roasting level of the image 103 to perform similar applications as described in the first embodiment.

Similarly, in some embodiments, as shown in FIG. 2A, the processor 35 determines the region of interest RI on the image 103 to perform corresponding operations or settings according to the region of interest RI to decrease the range for comparison and improve the accuracy and efficiency of comparing images by the processor 35. Since the operations and settings are the same as those of the first embodiment, it is not described here.

The following descriptions describe how to use the control signal for various applications after the bean roasting apparatus 3 generates the control signal. In an embodiment, the bean roasting apparatus 3 may further comprises a loudspeaker 39 electrically connected to the processor 35. In this case, the processor 35 may transmit the generated control signal to the loudspeaker 39 to make the loudspeaker 39 send a reminder signal. In this way, as the bean roasting apparatus 3 determines different roasting levels (i.e., the $1^{st}$ Crack Starts stage, the Pt Crack Done stage, the Full City and $2^{nd}$ Crack stage, etc.), the user may decide the time to offload the beans according to the reminder signal.

Further, in an embodiment, the bean roasting apparatus 3 further comprises a display panel 41 electrically connected to the processor 35. In this case, the processor 35 may transmit the generated control signal to the display panel 41 to make the display panel 41 display a reminder screen. In this way, as the bean roasting apparatus 3 determines the roasting level, the user may decide the time to offload the beans according to the reminder screen.

In addition, in an embodiment, the bean roasting apparatus 3 may further comprises a transceiver 43 electrically connected to the processor 35. In this case, the processor 35 may transmit the generated control signal to the transceiver 43 to make the transceiver 43 transmit a reminder message to a user equipment according to the received control signal. For example, the user equipment may be a smart phone, and the manufacturer of the bean roasting apparatus 3 may design an application which may be installed in the smart phone. Therefore, when the smart phone of the user is installed with the application, the smart phone may be connected to the bean roasting apparatus 3 directly (directly via wireless technology) or indirectly (via regional network, internet, etc.) to receive the reminder message from the bean roasting apparatus 3. In this way, as the bean roasting apparatus 3 determines the roasting level, the user may be notified immediately and may decide the time to offload the beans.

In addition, in an embodiment, the bean roasting apparatus 3 may further comprises a transceiver 43 electrically connected to the processor 35. In this case, the processor 35 may receive a feedback signal from a user equipment via the transceiver 43, and updates the historical roasting pattern set according to the feedback signal. For example, if the user thinks that the selected historical roasting pattern may not accurately represent the roasting level of the current coffee beans and wants to add a new historical roasting pattern to the historical roasting pattern set, then the feedback signal may comprises a new historical roasting pattern and a roasting level and a plurality of color attributes corresponding to the new historical roasting pattern to update the historical roasting pattern set. In addition, the user may also generate the new historical roasting pattern and the corresponding roasting level by the image 103 captured by the image capturing device 33.

In addition, in an embodiment, the bean roasting apparatus 3 further comprises a temperature sensing device 45 and a timer 47. The temperature sensing device 45 is electrically connected to the processor 35 to sense a real-time temperature in the chamber 37, and the timer 47 is electrically connected to the processor 35 to provide a real-time roasting elapsed time. The processor 35 further generates an real-time roasting curve (such as the real-time roasting curve 401 shown in FIG. 4) according to the real-time roasting time provided by the timer 47 and the real-time temperature provided by the temperature sensing device 45, to record the curve on the temperature and time coordinate of roasting the coffee beans, store the real-time roasting curve 401 in the storage 31, and provide it to the user as a reference for adjustment of the roasting process in the future.

In addition, in an embodiment, the bean roasting apparatus 3 further comprises a heating control element 49 and an airflow control element 51. In this case, the storage 31 further stores a historical roasting curve with a plurality of coordinate points. There is an one-to-one relationship between the plurality of coordinate points and the plurality of historical roasting patterns, and therefore the processor 35 further controls the heating control element 49 and the airflow control element 51 to change the real-time temperature in the chamber 37 according to one of the plurality of coordinate points which corresponds to the image 103, the historical roasting curve, and the real-time roasting curve.

Figure 4:
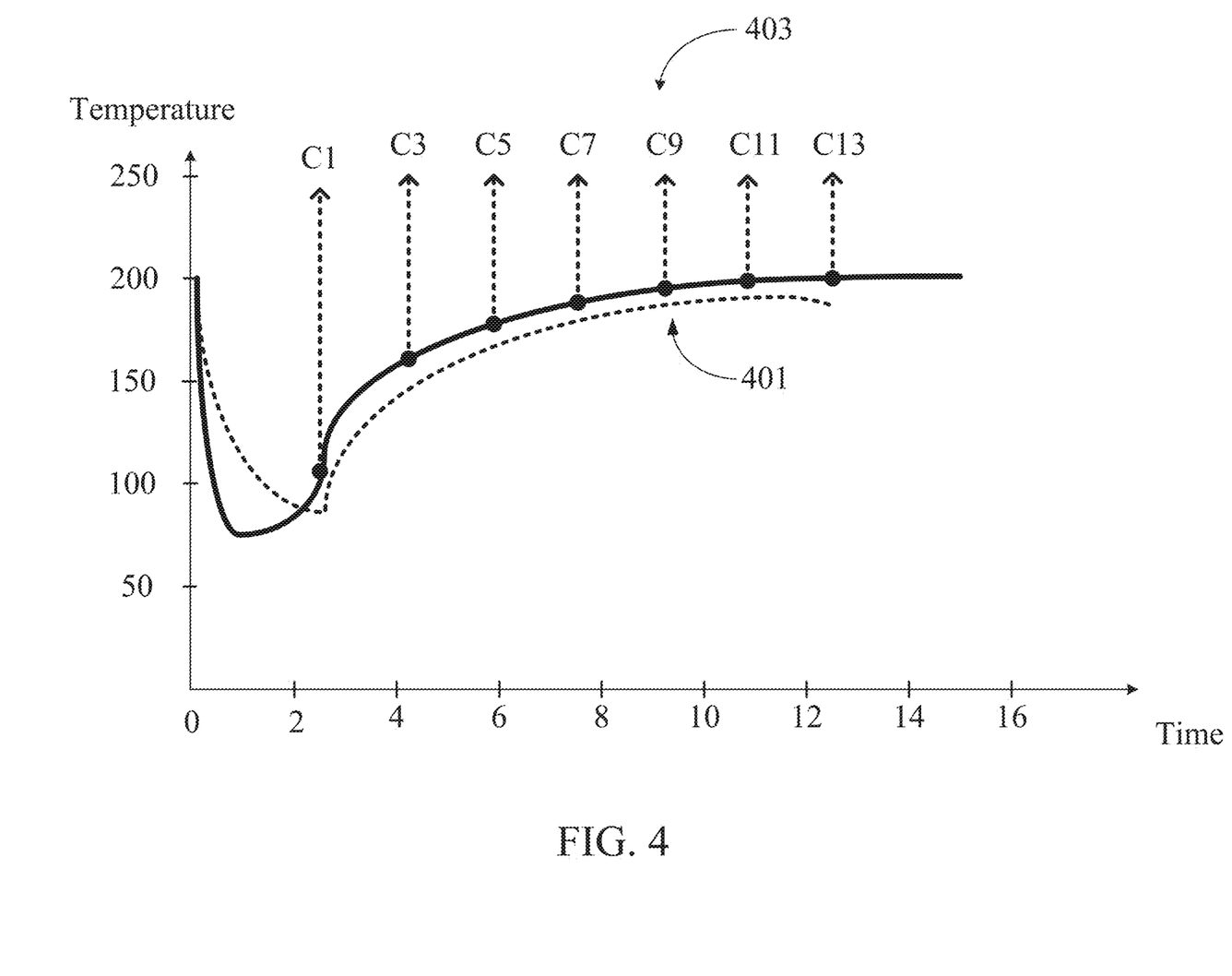
FIG. 4 depicts a schematic view of the real-time roasting curve 401 and the historical roasting curve 403 of the present invention.

For example, since historical roasting patterns of different types of coffee beans have their suitable roasting methods (e.g., different temperature and time controls are required), the user may pre-store a history roasting curve that matches a certain type of coffee beans as a standard reference condition for roasting. As shown in FIG. 4, the storage 31 further stores a historical roasting curve 403 which records a curve on the temperature and time coordinate to indicate the suitable temperature at each time interval for the coffee beans. Continued to the first embodiment, the historical roasting curve 401 further comprises a plurality of coordinate points corresponding to the historical roasting patterns of the numbers C1 to C7, and only the historical roasting patterns of the numbers C1, C3, C5, C7, C9, C11, and C13 are shown in FIG. 4 due to the limitation of space, which orderly represent the roasting levels: the Green coffee stage, the Early Yellow stage, the Light Brown stage, the Pt Crack Starts stage, the City Roast stage, the Full City stage, and the Vienna-Light French stage.

Due to the factors such as the water content of different batches of beans, the actual temperature of the coffee beans during the roasting process may be different. The bean roasting apparatus 3 may control the heating control element 49 and the airflow control element 51 to adjust the temperature of the chamber 37 according to the coordinate points, the real-time roasting curve 401, and the historical roasting curve 403. For example, the processor 35 determines that the real-time roasting curve 401 has reached the roasting level at the Begins to Pale stage of the number C2 according to the received image, determines the suitable temperature of the coffee beans in the roasting level at the stage of the number C2 is about 162.5 Celsius degree according to the historical roasting curve 403, and controls the heating control element 49 and the airflow control element 51 to adjust the temperature of the chamber 37 to the corresponding temperature.

For another example, the bean roasting apparatus 3 may determine the amplitude of the adjustment through the slope of the roasting curve. When the slope of the real-time roasting curve 401 in a time interval is greater than the slope of the historical roasting curve 403 in the time interval, the bean roasting apparatus 3 determines that the roasting level is rising too fast, and the processor 35 controls the heating control element 49 and the airflow control element 51 to adjust the temperature of the chamber 37 by reducing the heating power or enlarging the damper. In this way, the bean roasting apparatus 3 may automatically make an optimal adjustment to make the roasting flavor of the coffee beans meet the desire of the user.

In addition, based on the user's setting (e.g., selecting the roasting level of the coffee beans), the bean roasting apparatus 3 may automatically control the heating control element 49 and the airflow control element 51 based on the information provided by the historical roasting curve 403 to adjusted the temperature of the chamber 37 to a suitable real-time temperature for fully automatic roasting operation.

In other embodiments, the bean roasting apparatus 3 further comprises a discharge port 55 and a discharge port control element 53. The discharge port control element 53 is electrically coupled to the processor 35. In this case, the processor 35 further transmits a control signal to the discharge port control element 53 to make the discharge port control element 53 open the discharge port 55 to discharge the plurality of coffee beans in the chamber 37. Furthermore, the user may remotely monitor the roasting condition of the coffee beans by operating application through the user equipment, and make the user equipment generate the remote control signal and transmit the remote control signal to the bean roasting apparatus 3 to remotely control the subsequent process of the offloading and cooling the coffee beans.

In addition, in an embodiment, the bean roasting apparatus 3 may perform the big data analysis according to a plurality of different data, and use the analysis result as reference data for automatic roasting. For example, the bean roasting apparatus 3 may combine the various information such as the roasting curves, the temperature changes, the roasting time, the types of coffee bean, the cup measuring result, the user feedback signal and the like, and analyze through various means such as the machine learning, the deep learning, the artificial intelligence, and the like, to adjust the flow/parameters during the automatic roasting process based on the analysis results.

In addition to the aforesaid operations, the processor 35 of this embodiment may also execute all the operations and have all the corresponding functions of the processor 15 described in the aforesaid embodiment. How this embodiment executes these operations and has these functions will be readily appreciated by a person having ordinary skill in the art based on the explanation of the aforesaid embodiment, and thus will not be further described herein.

In summary, the present invention provides an assisting mechanism for bean roasting, by capturing a scene in a chamber during the bean roasting process to produce a real-time image, and comparing the real-time image with a historical roasting pattern set to determine the roasting level represented by the real-time image (i.e., the current roasting level of the coffee beans) to generate a control signal. Through various applications of the control signals, the present invention may inform the bean roaster of the roasting level of the coffee beans by various reminders. In this way, compared with the prior art, the assisting mechanism for bean roasting of the present invention may accurately determine the roasting level of the coffee beans without human intervention, reduce the influence of human interference factors to assist the roaster in the roasting process to obtain real-time roasting level of the coffee beans. In this way, the roaster may receive the roasting information of the bean roasting device without the need of waiting beside the bean roasting device for a long time. In addition, the assisting apparatus for bean roasting of the present invention may further achieve automated roasting of performing the operation such as roasting, offloading the beans, and the like according to the roasting level set by the roaster.

The above invention is related to the detailed technical contents and inventive features thereof. People skilled in this field may proceed with a variety of modifications and replacements based on the inventions and suggestions of the invention as described without departing from the characteristics thereof. Nevertheless, although such modifications and replacements are not fully disclosed in the above descriptions, they have substantially been covered in the following claims as appended.

What is claimed is:

1. An assisting apparatus for bean roasting, comprising:
   a storage, being configured to store a historical roasting pattern set, the historical roasting pattern set comprising a plurality of historical roasting patterns, wherein there is a one-to-one relationship between the plurality of historical roasting patterns and a plurality of coordinate points of a historical roasting curve of a bean roasting device, and;
   an image capturing device, being configured to capture a scene in a chamber of the bean roasting device to generate an image;
   a processor, electrically connected to the storage and the image capturing device, being configured to receive the image from the image capturing device, compare the image with the historical roasting pattern set based on a plurality of color attributes of a color space to determine a roasting level represented by the image, and generate a first control signal; and
   a transceiver, electrically connected to the processor, wherein the processor further transmits the control signal to the transceiver to make the transceiver transmits a second control signal to the bean roasting device to enable the bean roasting device to perform a roasting operation;
   wherein during the roasting operation, the bean roasting device is configured to control a heating control element and an airflow control element of the bean roasting device to change a real-time temperature in the chamber according to one of the coordinate points which corresponds to the image, the historical roasting curve, and a real-time roasting curve of the bean roasting device.

2. The assisting apparatus of claim 1, further comprising a loudspeaker electrically connected to the processor, wherein the processor further transmits the first control signal to the loudspeaker to make the loudspeaker generate a prompting signal.

3. The assisting apparatus of claim 1, further comprising a display panel electrically connected to the processor, wherein the processor further transmits the first control signal to the display panel to make the display panel display a prompting picture.

4. The assisting apparatus of claim 1, wherein the processor further transmits the first control signal to the transceiver to make the transceiver transmit a prompting message to a user equipment.

5. The assisting apparatus of claim 1, wherein the processor further receives a feedback signal from a user equipment via the transceiver, and updates the historical roasting pattern set according to the feedback signal.

6. The assisting apparatus of claim 1, wherein the processor further determines a region of interest on the image, and the processor further compares the region of interest of the image with the historical roasting pattern set based on the plurality of color attributes of the color space to determine the roasting level represented by the image.

7. A bean roasting apparatus, comprising:
   a chamber;
   a storage, being configured to store a historical roasting pattern set;
   an image capturing device, being configured to capture a scene in the chamber to generate an image;
   a processor, electrically connected to the storage and the image capturing device, being configured to receive the image from the image capturing device, compare the image with the historical roasting pattern set based on a plurality of color attributes of a color space to determine a roasting level represented by the image, and generate a control signal;
   a heating control element; and
   an airflow control element, wherein the storage further stores a historical roasting curve with a plurality of coordinate points, the historical roasting pattern set comprises a plurality of historical roasting patterns, there is an one-to-one relationship between the coordinate points and the historical roasting patterns, and the processor is further configured to control the heating control element and the airflow control element to change a real-time temperature in the chamber according to one of the coordinate points which corresponds to the image, the historical roasting curve, and a real-time roasting curve.

8. The bean roasting apparatus of claim 7, further comprising a loudspeaker electrically connected to the processor, wherein the processor further transmits the control signal to the loudspeaker to make the loudspeaker generate a prompting signal.

9. The bean roasting apparatus of claim 7, further comprising a display panel electrically connected to the processor, wherein the processor further transmits the control signal to the display panel to make the display panel display a prompting picture.

10. The bean roasting apparatus of claim 7, further comprising a transceiver electrically connected to the processor, wherein the processor further transmits the control signal to the transceiver to make the transceiver transmit a prompting message to a user equipment.

11. The bean roasting apparatus of claim 7, further comprising a transceiver electrically connected to the processor, wherein the processor further receives a feedback signal from a user equipment via the transceiver, and updates the historical roasting pattern set according to the feedback signal.

12. The bean roasting apparatus of claim 7, further comprising:
   a temperature sensing device, being electrically connected to the processor, and being configured to sense the real-time temperature in the chamber; and a timer, being electrically connected to the processor, and being configured to provide a real-time roasting elapsed time.

13. The bean roasting apparatus of claim 12, wherein the processor further generates the real-time roasting curve according to the real-time temperature and the real-time roasting elapsed time, and stores the real-time roasting curve to the storage.

14. The bean roasting apparatus of claim 7, wherein the processor further determines a region of interest on the image, and the processor further compares the region of interest of the image with the historical roasting pattern set based on the plurality of color attributes of the color space to determine the roasting level represented by the image.

15. The bean roasting apparatus of claim 7, further comprising a discharge port and a discharge port control element, wherein the discharge port control element is electrically connected to the processor and the processor further transmits the control signal to the discharge port control element to make the discharge port control element open the discharge port to discharge a plurality of coffee beans in the chamber.

\* \* \* \* \*